United States Patent
Cai

(10) Patent No.: US 12,433,961 B2
(45) Date of Patent: Oct. 7, 2025

(54) NEAR-INFRARED FLUORESCENT PROBE SPECIFICALLY TARGETING TUMORS AS WELL AS SYNTHESIS METHOD AND USE THEREOF

(71) Applicant: NANJING NUOYUAN MEDICAL INSTRUMENT CO. LTD, Nanjing (CN)

(72) Inventor: Huiming Cai, Nanjing (CN)

(73) Assignee: NANJING NUOYUAN MEDICAL INSTRUMENT CO. LTD, Nanjing (CN)

( * ) Notice: Subject to any disclaimer, the term of this patent is extended or adjusted under 35 U.S.C. 154(b) by 0 days.

(21) Appl. No.: 17/907,973

(22) PCT Filed: May 9, 2022

(86) PCT No.: PCT/CN2022/091632
§ 371 (c)(1),
(2) Date: Aug. 30, 2022

(87) PCT Pub. No.: WO2023/165015
PCT Pub. Date: Sep. 7, 2023

(65) Prior Publication Data
US 2025/0009907 A1  Jan. 9, 2025

(30) Foreign Application Priority Data
Mar. 1, 2022 (CN) .......... 202210191870.6

(51) Int. Cl.
*A61B 5/00* (2006.01)
*A61B 8/00* (2006.01)
*A61B 10/00* (2006.01)
*A61K 49/00* (2006.01)
*C07D 401/14* (2006.01)
*C09K 11/06* (2006.01)

(52) U.S. Cl.
CPC ........ *A61K 49/0021* (2013.01); *C07D 401/14* (2013.01); *C09K 11/06* (2013.01); *C09K 2211/1029* (2013.01); *C09K 2211/1044* (2013.01)

(58) Field of Classification Search
CPC .. A61K 49/0021; C07D 401/14; C09K 11/06; C09K 2211/1029; C09K 2211/1044
See application file for complete search history.

(56) References Cited

U.S. PATENT DOCUMENTS

2003/0219383 A1  11/2003  Weissleder et al.
2006/0147378 A1   7/2006  Tung et al.
2021/0325399 A1  10/2021  Martel et al.

OTHER PUBLICATIONS

Barrott et al. (Chem. Biol. 2013, 20, 1187-1197).*
Wan et al. (2012 International Conference of Biomedical Engineering and Biotechnology, pp. 837-840).*
Dong et al. (Sci. Reports 2016, 6, 2-605, pp. 1-9).*
Kosaka et al. (Future Oncol. 2009, 5(9): 1501-1511, see pp. 1-17).*
Wei et al. (J. Pharm. Sci. 104:165-177, 2015).*

* cited by examiner

Primary Examiner — Michael G. Hartley
Assistant Examiner — Melissa J Perreira
(74) Attorney, Agent, or Firm — Hemisphere Law, PLLC; Zhigang Ma

(57) ABSTRACT

The present disclosure provides a near-infrared fluorescent probe specifically targeting tumors as well as a synthesis method and use thereof. The near-infrared fluorescent probe specifically targeting tumors is a compound represented by formula I or a pharmaceutically available salt thereof:

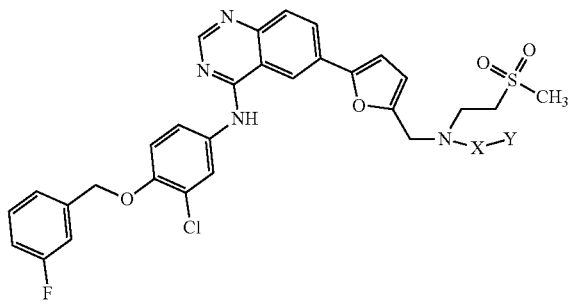

Formula I wherein, X is a linker molecule selected from $PEG_n$ and glycine $(G_m)$, n=0-10, m=0-10, one end of the linker molecule is amino, and the other end of the linker molecule is carboxyl; Y is a dye molecule having a fluorescence excitation and emission spectrum within a near-infrared (NIR) range, and the compound represented by formula I or pharmaceutically available salt thereof can maintain or enhance the fluorescence of the dye molecule Y. The near-infrared fluorescent probe of the present disclosure can be rapidly cleared away in normal tissues, and remains for a long time in tumor sites, thereby taking the effect of living diagnosis. Hence, the near-infrared fluorescent probe of the present disclosure has a certain clinical application prospect, and can be applied to clinical surgery navigation.

3 Claims, 3 Drawing Sheets

NEAR-INFRARED FLUORESCENT PROBE SPECIFICALLY TARGETING TUMORS AS WELL AS SYNTHESIS METHOD AND USE THEREOF

TECHNICAL FIELD

The present disclosure belongs to the technical field of specific molecule targeting diagnosis reagents, and particularly relates to a diagnosis reagent composite composed of a near-infrared fluorescent dye, a linker molecule and a small molecule inhibitor lapatinib.

BACKGROUND

At present, cancer is one of chief culprits that seriously endanger the health of Chinese residents in addition to cardiovascular diseases, which seriously harms the health of humans. In clinic, treatment on tumors mainly includes surgical excision, chemotherapy drugs, radiotherapy drugs, etc. Among them, surgical excision is one of optimal therapies for solid tumors, effective surgical resection can greatly prolong the survival period of patients. In recent years, occurrence of various advanced instruments and equipment such as magnetic resonance imaging, ultrasonic imaging, Spect/CT contrast can precisely locate tumors to find the sites where lesions are located and then conduct targeted treatment. Near-infrared fluorescence imaging with a wave band ranging from 650 nm to 900 nm has good penetrating power, strong anti-interference and low cost, can be used in surgery, and provides surgeons more clear views, thereby more precisely excising tumors.

Indocyanine green (ICG) is a near-infrared fluorescent dye that is approved by FDA, can bind to plasma proteins, and gathers on the site of the tumor via an enhanced permeability and retention (EPR) effect. Generally speaking, intravenous administration is conducted one day before surgery, and then surgery is conducted on the next day after one-day metabolism, in such a way, liver and intestines in a body are basically cleared away, so as not to interfere with the surgery. However, there is still a problem that administration needs to be conducted one day in advance and subjected to hepatointestinal metabolism, which is not conducive to imaging of liver and intestinal tumors and results in a fact that ICG is prone to false positives. In order to avoid the false positives, it is needed to develop a specific targeted fluorescent probe that is metabolized via kidney, thereby realizing more widespread application prospects. The specific targeted fluorescent probe is specifically accumulated on the site of the tumor after administration and remained for a long time in the tumor, but can be rapidly cleared away in normal tissues, and therefore surgical excision is better conducted in the process of surgeon's operation procedure.

Lapatinib is an anti-tumor drug that has been on sale, belongs to a tyrosine kinase inhibitor with a target spot Her2, and can be used for treatment of breast cancer and colorectal cancer. Lapatinib can specifically target tumor tissues and activate a pathway to further cause tumor cell appotosis, thereby playing a role in treating tumor. In the process of developing tumor-specific fluorescent probes, anti-tumor drugs having a tumor-specific killing effect have a certain research value, and can be used for development of specific fluorescent probes to further enlarge the application value of drugs, and can be used for surgery navigation and tumor excision.

SUMMARY

In order to solve the problems existing in the prior art, the objective of the present disclosure is to provide a near-infrared fluorescent probe specifically targeting tumors as well as a synthesis method and use thereof.

In order to achieve the above objective, the present disclosure adopts the following technical solution:

Provided is a near-infrared fluorescent probe specifically targeting tumors, wherein the near-infrared fluorescent probe is a compound represented by formula I or a pharmaceutically available salt thereof:

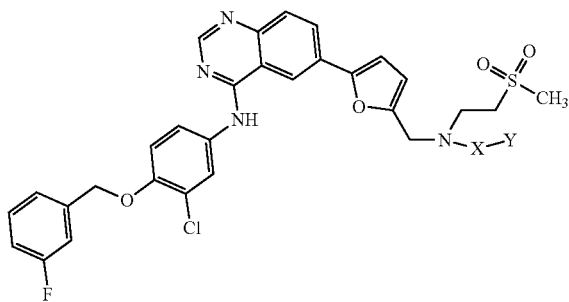

Formula I wherein:
X is a linker molecule selected from $PEG_n$ and glycine $G_m$, n=0-10, m=0-10, one end of the linker molecule is amino, and the other end of the linker molecule is carboxyl;
Y is a dye molecule having a fluorescence excitation and emission spectrum within a near-infrared (NIR) range, and the compound represented by formula I or pharmaceutically available salt thereof can maintain or enhance the fluorescence of the dye molecule Y.

The linker molecule is selected from PEG4, PEG6, 6-aminocaproic acid, glycine G3, glycine G6 and PEG4-glycine, and has the following structure:

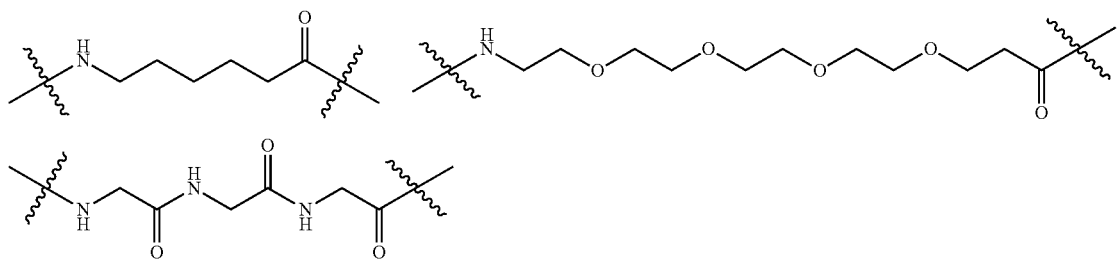

-continued

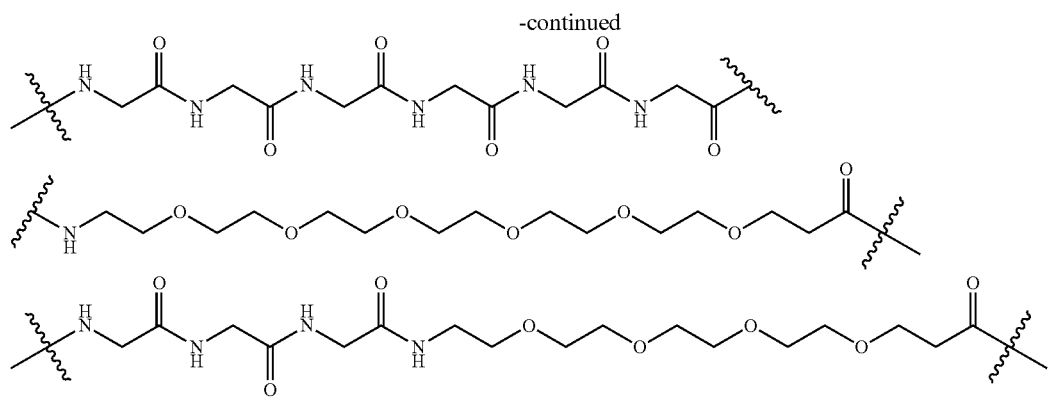

The dye molecule Y is selected from the following structure:

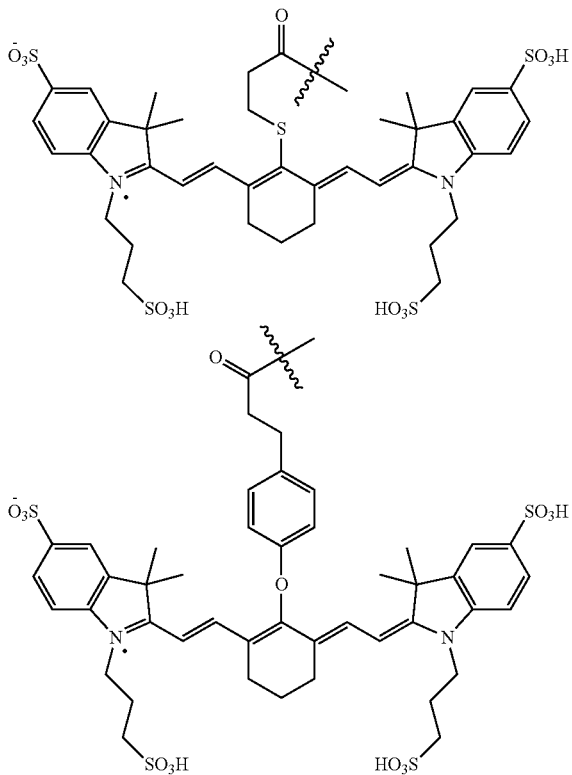

Provided is a method for synthesizing a near-infrared fluorescent probe specifically targeting tumors, comprising the following steps:

Step a, mixing lapatinib and X in the presence of 2-(7-azabenzotriazole)-N,N,N',N'-tetramethylurea hexafluorophosphate, an alkaline and a polar solvent;

Step b, dropwise adding the product obtained in Step a into water, extracting and then concentrating, subsequently adding trifluroracetic acid to remove BOC protective group, and concentrating to obtain a lapatinib-X intermediate compound;

Step c, mixing the lapatinib-X intermediate compound with a dye molecule Y in the presence of 2-(7-azabenzotriazole)-N,N,N',N'-tetramethylurea hexafluorophosphate, an alkaline and a polar solvent; and Step d, purifying the product obtained in Step c with a preparative liquid phase to obtain a target compound lapatinib-X-Y, namely, the near-infrared fluorescent probe.

In the Step a and Step c, the polar solvent is one or more of N,N-dimethylformamide (DMF), anhydrous dimethylsulfoxide (DMSO) and N-methylpyrrolidone.

In the Step a and Step c, the alkaline is one or more of triethylamine and N,N-diisopropylethylamine (DIEA).

Provided is use of the near-infrared fluorescent probe specifically targeting tumors in preparation of tumor diagnosis reagents.

Provided is use of the near-infrared fluorescent probe specifically targeting tumors in preparation of living fluorescence imaging reagents for precise tumor surgery navigation.

The tumor is one or more of liver cancer, breast cancer, lung cancer, pancreatic cancer and colorectal cancer.

The present disclosure has the beneficial effects that the near-infrared fluorescent probe specifically targeting tumors provided by the present disclosure can actively target the sites of tumors, does not gather in normal tissues or can be cleared away in a short time, so as not to affect its clinical application. The near-infrared fluorescent probe of the present disclosure can be rapidly cleared away in normal tissues, but can be remained in the site of the tumor for a long time, so as to take the effect of living diagnosis, and therefore it has a certain clinical application prospect and can be applied to clinical surgery navigation.

DETAILED DESCRIPTION OF THE EMBODIMENTS

Figure 1:
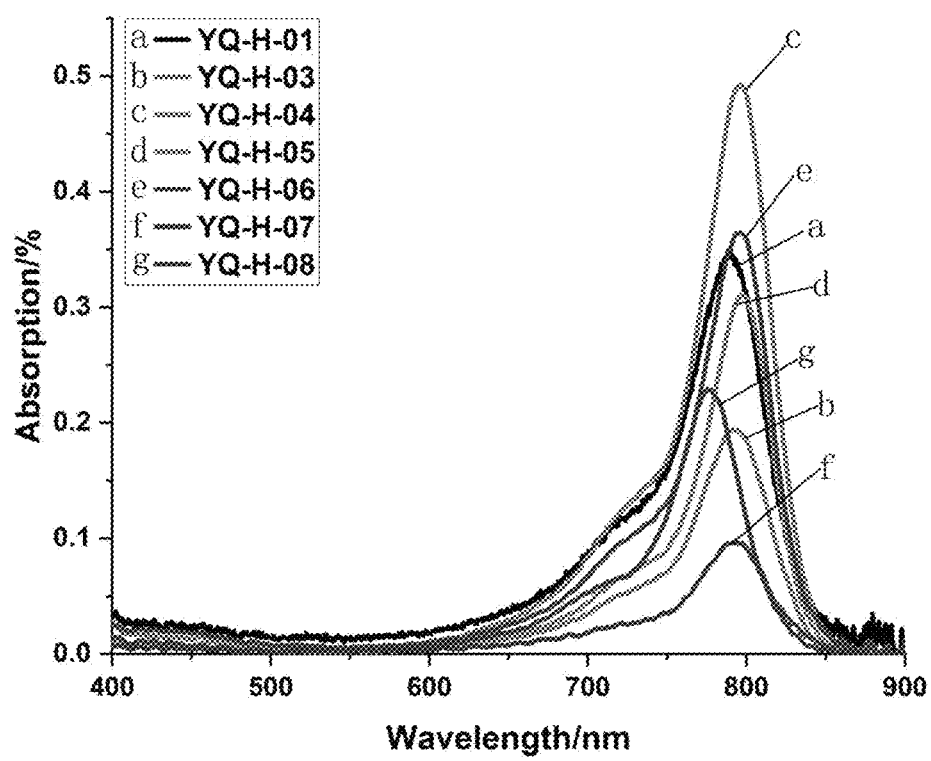
FIG. 1 is an absorption spectrum of YQ-H-01 and others prepared in embodiments.
Figure 2:
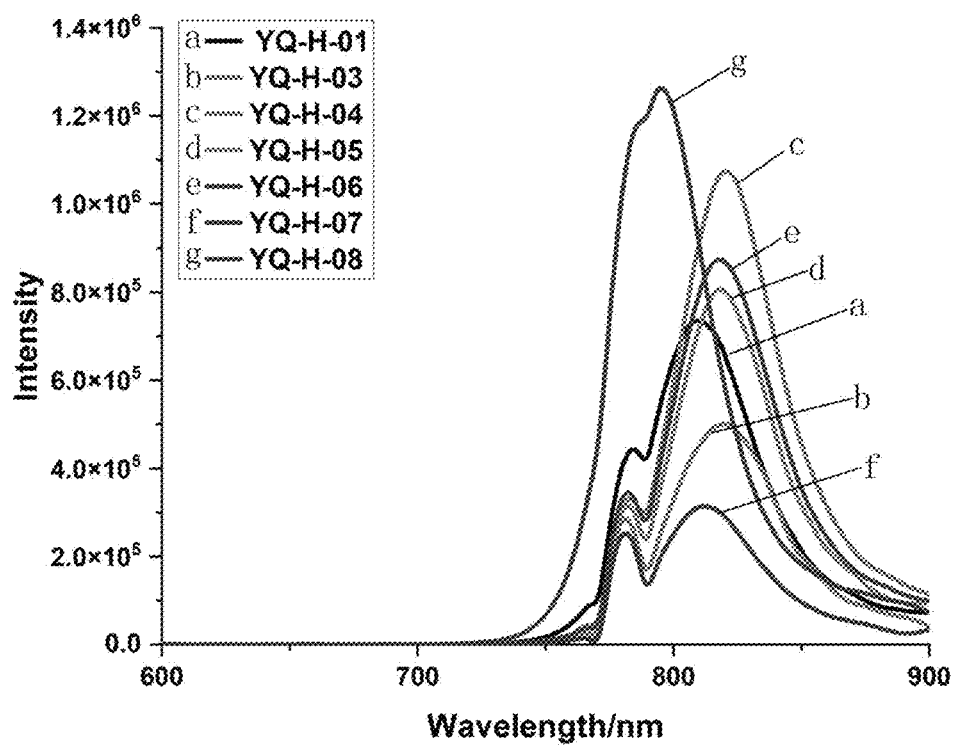
FIG. 2 is an fluorescence spectrum of YQ-H-01 and others prepared in embodiments.
Figure 3:
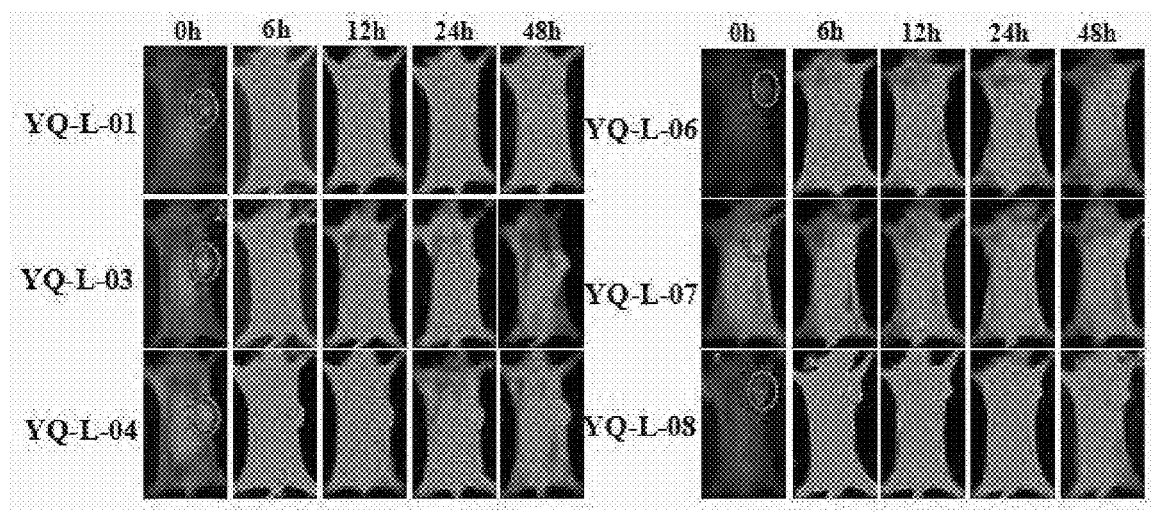
FIG. 3 shows in-vivo imaging of YQ-H-01 and others prepared in embodiments in colorectal cancer HT29 tumor-bearing mice.
Figure 4:
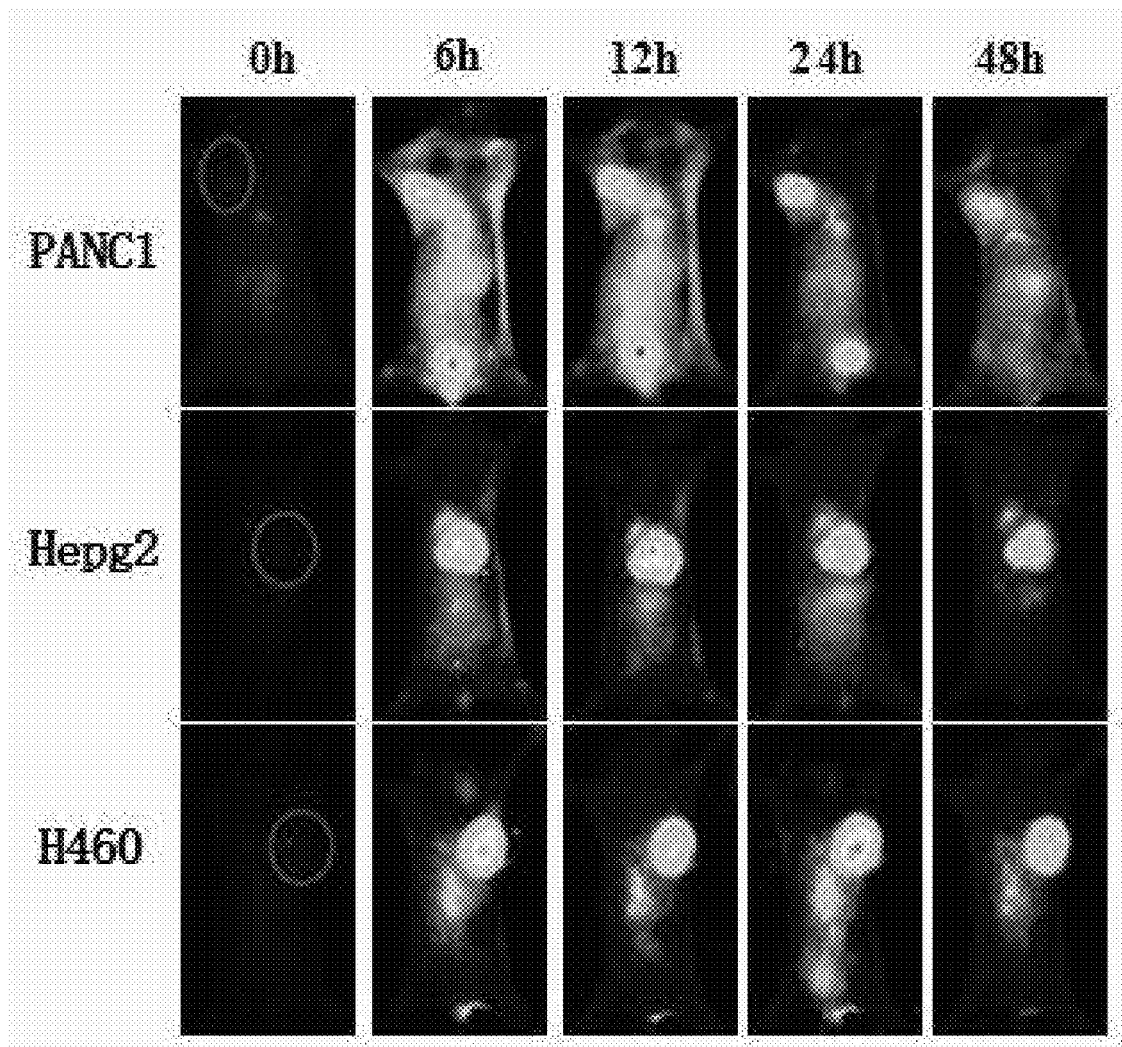
FIG. 4 shows in-vivo imaging of a YQ-H-01 probe prepared in an embodiment in pancreatic cancer PANC1, liver cancer HepG2 and lung cancer H460 tumor-bearing mice.

Next, the present disclosure will be further explained in combination with embodiments.

The present disclosure will be better understood according to embodiments below. However, those skilled in the art will easily understand that specific material proportions, process conditions and results described in embodiments are only for illustrating the present disclosure, but should not or do not limit the present disclosure described in claims.

Example 1: Synthesis of YQ-H-01 amine (6 μl, 5.0 eq) were reacted for 3 h at room temperature in the dark, the reaction was monitored by HPLC, the obtained product was purified by a preparative liquid phase after the reaction was completed, and a target fraction was lyophilized to obtain green solid YQ-H-01 (5 mg, Y=38.9%). By mass spectrum and nuclear magnetic hydrogen spectrum, its structure is verified as follows: m/z=, $^1$H NMR (300 MHz, DMSO) δ 8.88 (dd, J=15.1, 10.5 Hz, 2H), 8.66 (t, J=12.4 Hz, 2H), 8.24 (dd, J=11.1, 6.4 Hz, 1H), 8.01

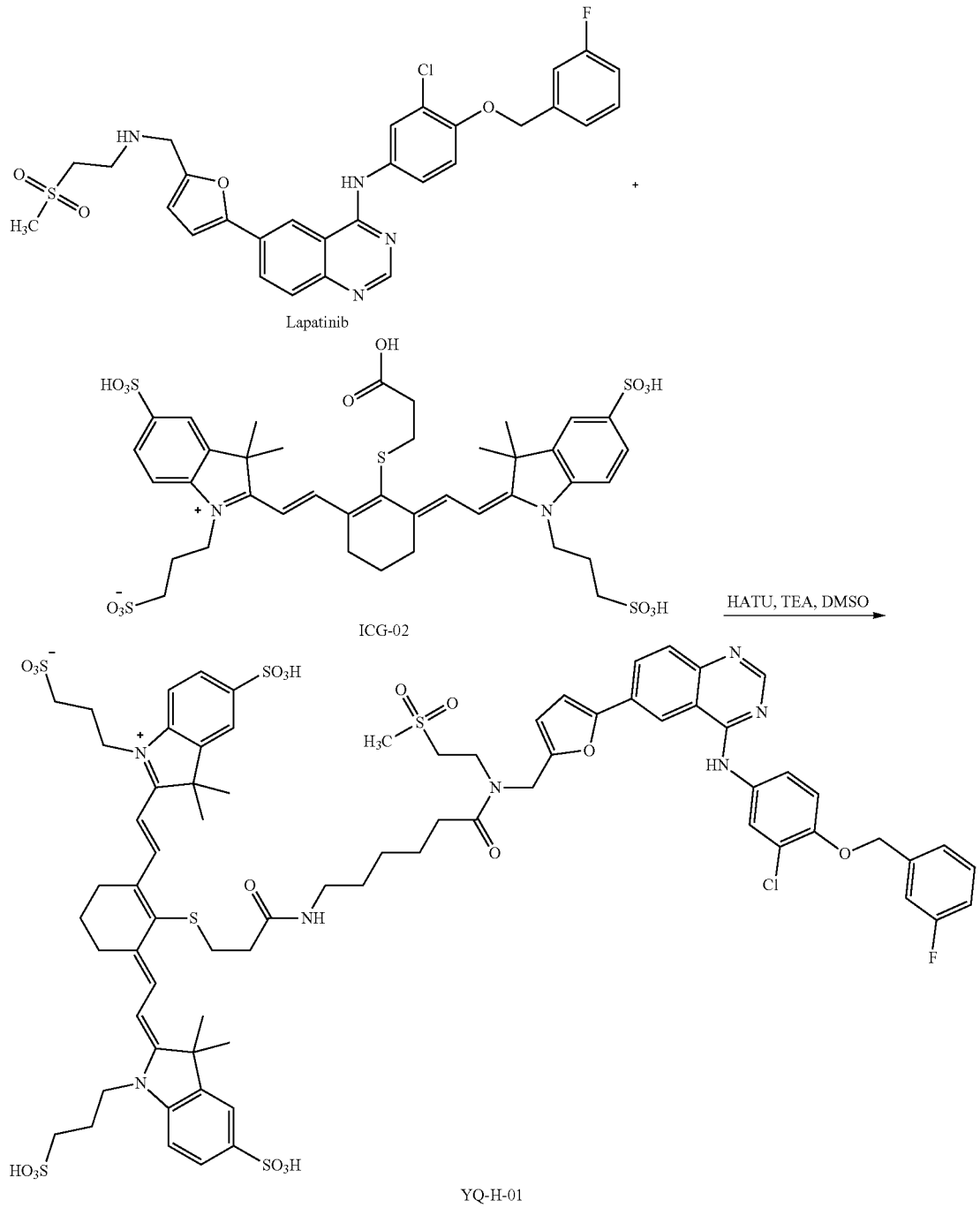

Lapatinib (5 mg, 1.0 eq), ICG-02 (12 mg, 1.5 eq), 2-(7-azabenzotriazole)-N,N,N',N'-tetramethylurea hexafluorophosphate (HATU, 13 mg, 4.0 eq) and triethyl- (t, J=2.8 Hz, 1H), 7.85-7.66 (m, 4H), 7.60-7.45 (m, 3H), 7.42-7.16 (m, 7H), 6.52 (dt, J=24.9, 7.5 Hz, 3H), 5.34 (s, 2H), 4.64 (s, 2H), 4.26 (d, J=7.2 Hz, 4H), 3.39 (t, J=8.0 Hz, 2H), 3.17 (s, 2H), 3.04 (d, J=9.4 Hz, 4H), 2.73-2.59 (m, 8H), 2.55 (s, 3H), 2.07-1.88 (m, 4H), 1.78-1.65 (m, 2H), 1.58 (d, J=7.6 Hz, 12H).
Example 2: Synthesis of YQ-H-03
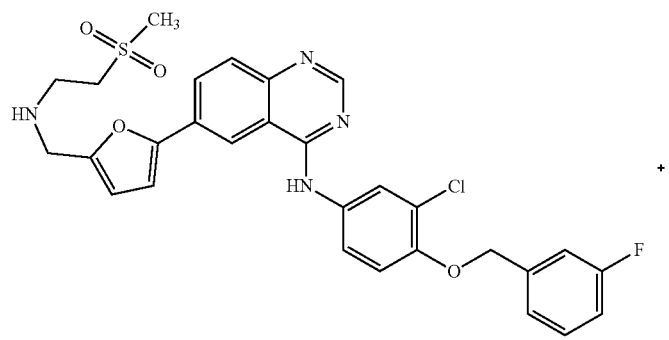
Lapatinib
Lapatinib (10 mg, 1.0 eq), 6-Boc-aminocaproic acid (8 mg, 2 eq), 2-(7-azabenzotriazole)-N,N,N',N'-tetramethyl-urea hexafluorophosphate (HATU, 13 mg, 2.0 eq) and triethylamine (7.2 μl, 3.0 eq) were reacted for 1 h at room temperature, the reaction was monitored by TLC, the reaction solution was dropwise added into water after the
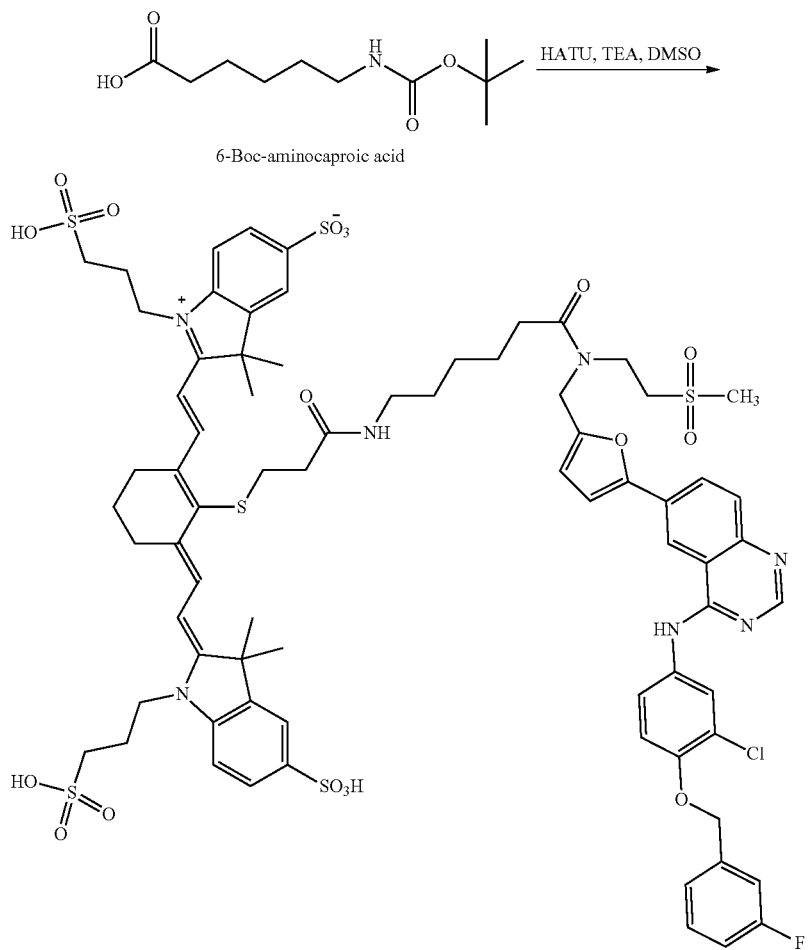
YQ-H-03 reaction was completed and then extracted with ethyl acetate, organic layers were combined and concentrated, then trifluoroacetic acid was added to remove Boc, the reaction was also monitored by TLC, trifluoroacetic acid was evaporated after the reaction was completed, the obtained product was purified to obtain lapatinib linking to 6-aminocaproic acid, and the rest steps referred to synthesis of compound YQ-H-01, so as to obtain a target compound YQ-H-03, a green solid. By mass spectrum and nuclear magnetic hydrogen spectrum, its structure is verified as follows: m/z=, $^1$H NMR (300 MHz, DMSO) δ 8.88 (dd, J=15.1, 10.5 Hz, 2H), 8.66 (t, J=12.4 Hz, 2H), 8.24 (dd, J=11.1, 6.4 Hz, 1H), 8.01 (t, J=2.8 Hz, 1H), 7.85-7.66 (m, 4H), 7.60-7.45 (m, 3H), 7.42-7.16 (m, 7H), 6.52 (dt, J=24.9, 7.5 Hz, 3H), 5.34 (s, 2H), 4.64 (s, 2H), 4.26 (d, J=7.2 Hz, 4H), 3.39 (t, J=8.0 Hz, 2H), 3.17 (s, 2H), 3.04 (d, J=9.4 Hz, 4H), 2.73-2.59 (m, 8H), 2.55 (s, 3H), 2.07-1.88 (m, 4H), 1.78-1.65 (m, 2H), 1.58 (d, J=7.6 Hz, 12H).

Example 3: Synthesis of YQ-H-04

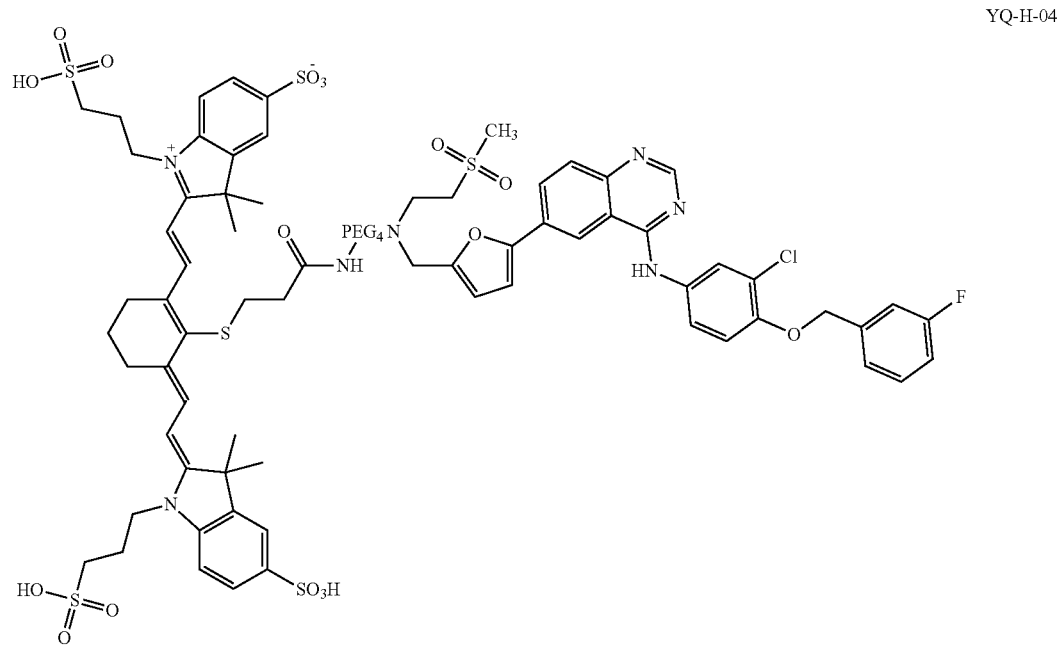

YQ-H-04

The synthesis method refers to synthesis of YQ-H-03. By mass spectrum and nuclear magnetic hydrogen spectrum, its structure is verified as follows: m/z=, $^1$H NMR (300 MHz, DMSO) δ 8.96 (dd, J=8.0, 4.8 Hz, 2H), 8.66 (d, J=14.0 Hz, 2H), 8.36 (d, J=8.9 Hz, 1H), 8.01-7.88 (m, 3H), 7.75 (d, J=1.2 Hz, 2H), 7.65 (ddd, J=9.6, 8.6, 1.9 Hz, 3H), 7.53-7.46 (m, 1H), 7.45-7.30 (m, 5H), 7.25-7.14 (m, 2H), 6.64-6.43 (m, 3H), 5.32 (s, 2H), 4.72 (d, J=23.4 Hz, 2H), 4.40-4.23 (m, 4H), 3.61-3.53 (m, 2H), 3.51-3.41 (m, 12H), 3.41-3.30 (m, 4H), 3.19-3.12 (m, 2H), 3.03 (d, J=4.6 Hz, 2H), 2.97 (td, J=6.6, 3.9 Hz, 2H), 2.76 (dd, J=11.9, 5.0 Hz, 2H), 2.73-2.59 (m, 8H), 2.55 (s, 3H), 2.42-2.31 (m, 2H), 2.10-1.91 (m, 4H), 1.80-1.71 (m, 2H), 1.65 (d, J=2.0 Hz, 12H).

Example 4: Synthesis of YQ-H-05

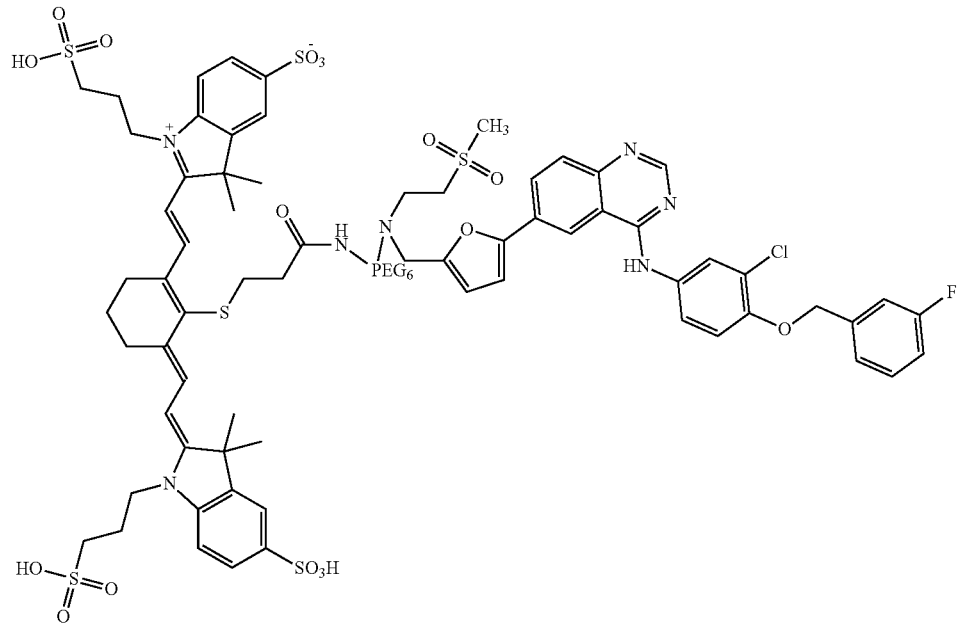

YQ-H-05

The synthesis method refers to synthesis of YQ-H-03. By mass spectrum and nuclear magnetic hydrogen spectrum, its structure is verified as follows: m/z=, $^1$H NMR (300 MHz, DMSO) δ 8.95 (t, J=2.6 Hz, 2H), 8.67 (d, J=14.1 Hz, 2H), 8.37 (dd, J=12.4, 3.7 Hz, 1H), 7.99 (dd, J=7.1, 3.6 Hz, 1H), 7.96-7.88 (m, 2H), 7.75 (d, J=1.0 Hz, 2H), 7.70-7.59 (m, 3H), 7.54-7.30 (m, 6H), 7.25-7.14 (m, 2H), 6.66-6.42 (m, 3H), 5.32 (s, 2H), 4.73 (d, J=23.7 Hz, 2H), 4.33 (s, 4H), 3.59-3.54 (m, 2H), 3.51-3.41 (m, 20H), 3.36 (dd, J=11.4, 5.8 Hz, 4H), 3.19-3.11 (m, 2H), 3.03 (s, 2H), 2.98 (d, J=6.8 Hz, 2H), 2.77 (dd, J=11.5, 5.5 Hz, 2H), 2.61 (dd, J=18.9, 12.8 Hz, 8H), 2.52 (d, J=1.6 Hz, 3H), 2.36 (t, J=6.9 Hz, 2H), 2.01 (dd, J=13.8, 7.4 Hz, 4H), 1.76 (d, J=3.2 Hz, 2H), 1.68 (d, J=10.9 Hz, 12H).

Example 5: Synthesis of YQ-H-06

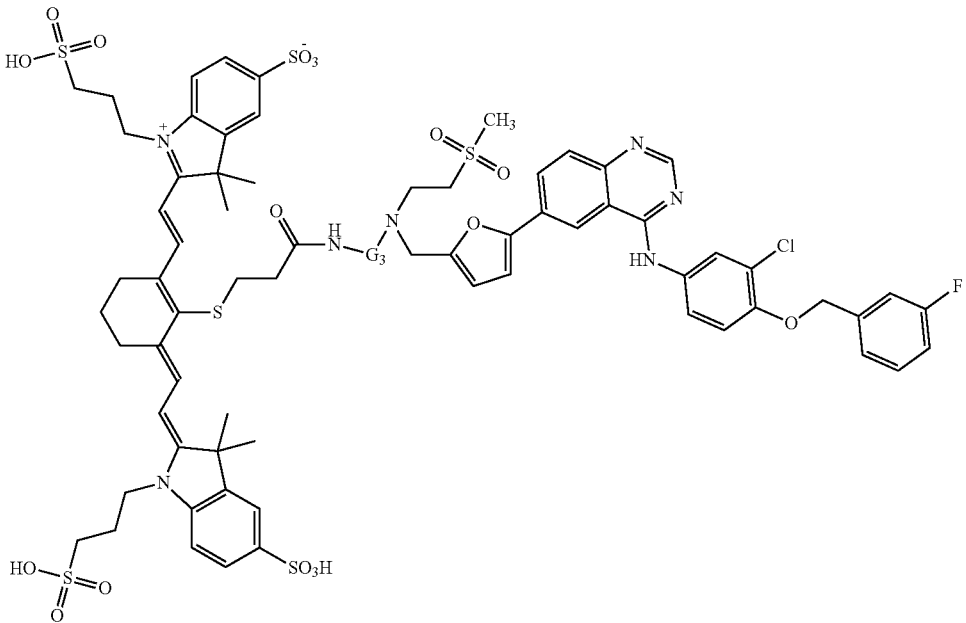

YQ-H-06

The synthesis method refers to synthesis of YQ-H-03. By mass spectrum and nuclear magnetic hydrogen spectrum, its structure is verified as follows: m/z=, $^1$H NMR (300 MHz, DMSO) δ 8.95 (s, 2H), 8.68 (dd, J=13.9, 6.0 Hz, 2H), 8.49-8.38 (m, 1H), 8.32-8.11 (m, 4H), 7.90 (dd, J=7.0, 2.9 Hz, 2H), 7.76 (s, 2H), 7.65 (dd, J=12.0, 5.6 Hz, 3H), 7.52-7.44 (m, 1H), 7.44-7.30 (m, 5H), 7.21 (dd, J=11.5, 5.7 Hz, 2H), 6.71-6.42 (m, 3H), 5.32 (s, 2H), 4.78-4.63 (m, 2H), 4.32 m, 4H), 4.16 (m, 2H), 3.48-3.25 (m, 6H), 3.17 (s, 2H), 3.09-2.99 (m, 4H), 2.76-2.56 (m, 8H), 2.52 (s, 3H), 2.45 (m, 2H), 2.02 (m, 4H), 1.76 (m, 2H), 1.72-1.55 (m, 12H).

Example 6: Synthesis of YQ-H-07

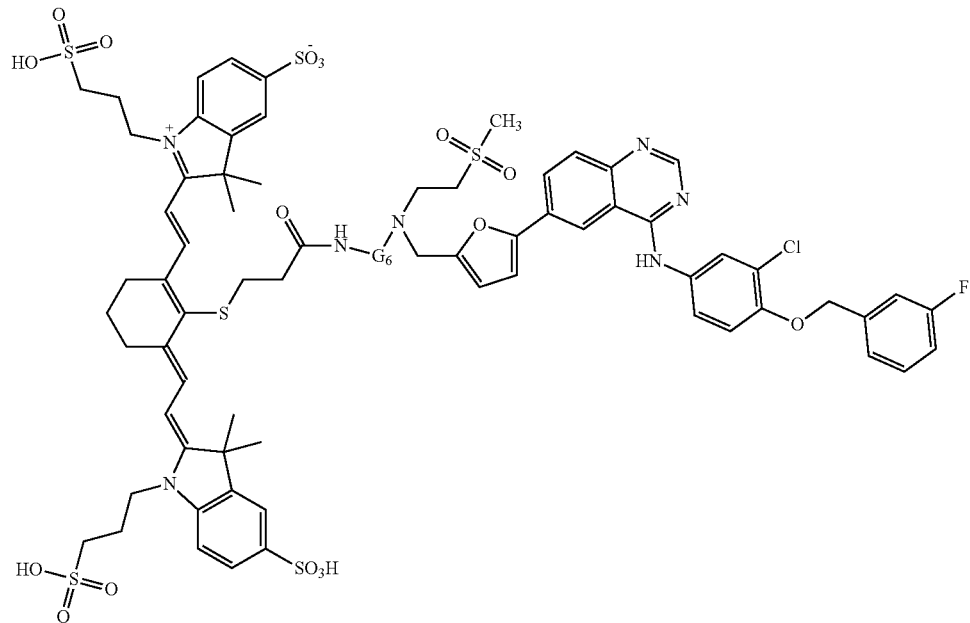

YQ-H-07

The synthesis method refers to synthesis of YQ-H-03. By mass spectrum and nuclear magnetic hydrogen spectrum, its structure is verified as follows: m/z=, $^1$H NMR (300 MHz, DMSO) δ 8.94 (s, 2H), 8.67 (d, J=14.0 Hz, 2H), 8.51-7.99 (m, 8H), 7.90 (dd, J=5.4, 2.8 Hz, 2H), 7.77 (s, 2H), 7.63 (d, J=8.4 Hz, 3H), 7.53-7.29 (m, 6H), 7.25-7.15 (m, 2H), 6.72-6.41 (m, 3H), 5.32 (s, 2H), 4.80-4.65 (m, 2H), 4.38-4.20 (m, 6H), 3.71 (d, J=4.9 Hz, 12H), 3.35 (p, J=7.9 Hz, 2H), 3.03 (s, 2H), 3.00-2.92 (m, 2H), 2.65 (dd, J=13.6, 8.1 Hz, 8H), 2.55 (s, 3H), 2.43 (dd, J=8.7, 2.8 Hz, 2H), 2.11-1.94 (m, 4H), 1.84-1.73 (m, 2H), 1.66 (s, 12H).

Example 7: Synthesis of YQ-H-08

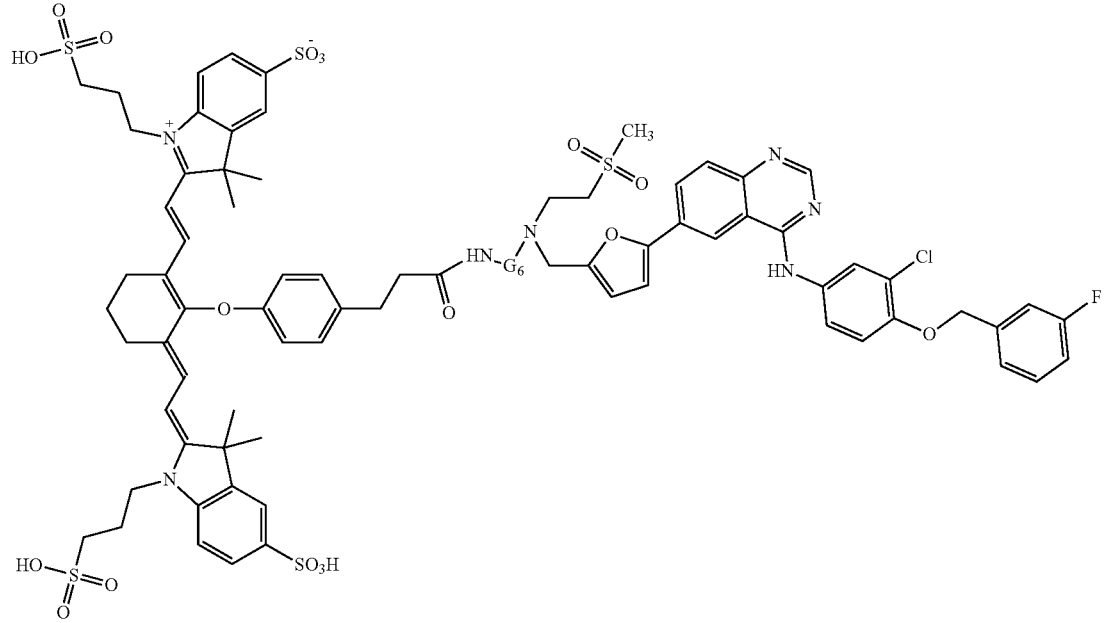

YQ-H-08

The synthesis method refers to synthesis of YQ-H-03. By mass spectrum and nuclear magnetic hydrogen spectrum, its structure is verified as follows: m/z=, $^1$H NMR (300 MHz, DMSO) δ 8.94 (d, J=3.5 Hz, 2H), 8.42 (dd, J=28.0, 9.0 Hz, 1H), 8.22-8.02 (m, 6H), 7.94-7.86 (m, 2H), 7.76 (dd, J=13.8, 7.2 Hz, 2H), 7.68-7.56 (m, 5H), 7.49 (td, J=8.0, 6.1 Hz, 1H), 7.37 (dd, J=12.7, 9.3 Hz, 5H), 7.20 (dd, J=9.0, 6.1 Hz, 4H), 7.01 (t, J=7.3 Hz, 2H), 6.63 (dd, J=43.4, 3.1 Hz, 1H), 6.34 (d, J=14.4 Hz, 2H), 5.32 (s, 2H), 4.73 (d, J=15.3 Hz, 2H), 4.21 (d, J=33.3 Hz, 6H), 3.78-3.64 (m, 12H), 3.36 (dd, J=12.9, 5.9 Hz, 2H), 3.03 (s, 2H), 2.83-2.64 (m, 6H), 2.59 (t, J=6.5 Hz, 4H), 2.55 (s, 3H), 2.35 (dd, J=13.1, 5.9 Hz, 2H), 2.05-1.91 (m, 4H), 1.91-1.80 (m, 2H), 1.22 (d, J=4.2 Hz, 12H).

The above descriptions are only preferred embodiments of the present disclosure. It should be noted that for persons of ordinary skill in the art, several improvements and modifications can also be made without departing from the principle of the present disclosure, and these improvements and modifications should be deemed as the protective scope of the present disclosure.

Example 8

In a subcutaneous tumor HT29 tumor-bearing mouse model, YQ-H (30 nmol, dissolved with 100 μL of normal saline for injection) series probes respectively underwent tail vein administration, fluorescence imaging was respectively photographed at different time points (0 h, 6 h, 12 h, 24 h and 48 h in sequence) by small animal living imaging CCD. Results show that in HT29 tumor-bearing mice, probes YQ-H-01/03 have a certain tumor targeting effect while having strong fluorescence signals in liver and the like, which is possibly disadvantageous for development of subsequent probes; probe YQ-H-08 introduces an aroma ring structure between target molecule lapatinib and fluorescent dye, which enhances the intake of tumors to a certain extent, and meanwhile leads to obvious whole body signal of mice probably caused by a fact that fat solubility is enhanced to bring about prolonged in-vivo metabolism time; probe YQ-H-04/06/07 exhibit better in-vivo metabolism features, fluorescence signals in liver are significantly reduced, and fluorescence signals in tumor sites are obvious, wherein the tumor effect of the probe YQ-H-06 is more excellent and has follow-up development potential.

On the basis of this, through tumor targeting validation of pancreatic cancer (PANC1), liver cancer (HepG2) and lung cancer (H460) tumor-bearing mice on the probe YQ-H-06, it is found that the probe YQ-H-06 has a good tumor targeting effect on three subcutaneous tumor bearing mice, and needs further research and development to be applied to clinical surgery navigation.

What is claimed is:

1. A method for synthesizing a near-infrared fluorescent probe specifically targeting tumors, wherein the near-infrared fluorescent probe is a compound represented by formula I or a pharmaceutically available salt thereof:

Formula I

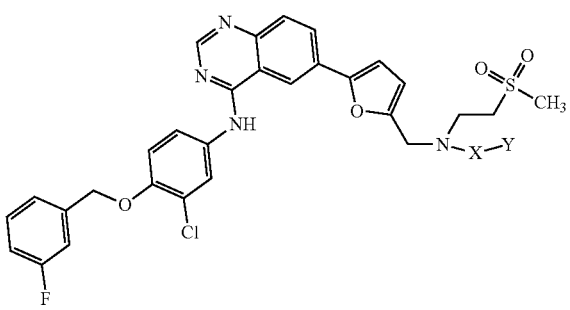

wherein:

X is a linker molecule selected from PEG$_4$, PEG$_6$, G$_3$ and G$_6$, have the following structures respectively:

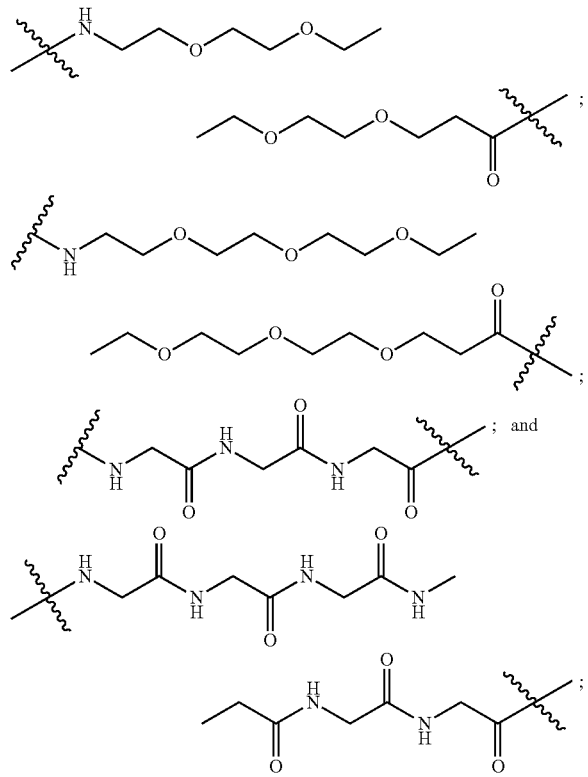

one end of the linker molecule is amino, and the other end of the linker molecule is carboxyl;

Y is a dye molecule having a fluorescence excitation and emission spectrum within a near-infrared (NIR) range, and the compound represented by formula I or pharmaceutically available salt thereof can maintain or enhance the fluorescence of the dye molecule Y;

the method comprises the following steps:

Step a, mixing lapatinib and X in the presence of 2-(7-azabenzotriazole)-N,N,N',N'-tetramethylurea hexafluorophosphate, an alkaline and a polar solvent;

Step b, dropwise adding the product obtained in Step a into water, extracting and then concentrating, subsequently adding trifluroracetic acid to remove a BOC protective group, and concentrating to obtain a lapatinib-X intermediate compound;

Step c, mixing the lapatinib-X intermediate compound with a dye molecule Y in the presence of 2-(7-azabenzotriazole)-N,N,N',N'-tetramethylurea hexafluorophosphate, an alkaline and a polar solvent; and Step d, purifying the product obtained in Step c with a preparative liquid phase to obtain a target compound lapatinib-X-Y, the near-infrared fluorescent probe.

2. The method for synthesizing the near-infrared fluorescent probe specifically targeting tumors according to claim 1, wherein in the Step a and Step c, the polar solvent is one or more of N,N-dimethylformamide, anhydrous dimethylsulfoxide and N-methylpyrrolidone.

3. The method for synthesizing the near-infrared fluorescent probe specifically targeting tumors according to claim 1, wherein in the Step a and Step c, the alkaline is one or more of triethylamine and N,N-diisopropylethylamine (DIEA).

* * * * *